United States Patent
Tang et al.

(10) Patent No.: US 7,228,752 B2
(45) Date of Patent: Jun. 12, 2007

(54) STRUCTURE OF A GEARBOX FOR ALL TERRAIN VEHICLES

(75) Inventors: Chin-Wei Tang, Kaohsiung (TW); Chao-Chang Ho, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 184 days.

(21) Appl. No.: 11/085,092

(22) Filed: Mar. 22, 2005

(65) Prior Publication Data

US 2006/0213745 A1    Sep. 28, 2006

(51) Int. Cl.
*F16D 7/08* (2006.01)
(52) U.S. Cl. .......................... 74/411; 192/56.62; 464/36
(58) Field of Classification Search ............. 192/56.62; 464/36
See application file for complete search history.

(56) References Cited

U.S. PATENT DOCUMENTS

| 3,263,451 | A | * | 8/1966 | Reimer | 464/35 |
| 4,365,961 | A | * | 12/1982 | Weilenmann et al. | 464/36 |
| 5,896,968 | A | * | 4/1999 | Bruntz | 464/36 |
| 2003/0051966 | A1 | * | 3/2003 | Sproatt et al. | 464/36 |
| 2004/0149508 | A1 | * | 8/2004 | Wildfellner | 180/312 |
| 2006/0172807 | A1 | * | 8/2006 | Shao | 464/35 |

FOREIGN PATENT DOCUMENTS

| GB | 2 165 899 A | * | 4/1986 |
| JP | 2-138549 A | * | 5/1990 |

* cited by examiner

*Primary Examiner*—Rodney H. Bonck
(74) *Attorney, Agent, or Firm*—Leong C. Lei

(57) ABSTRACT

A gearbox for all terrain vehicles which includes an engine having a crankshaft which drives a belt transmission mechanism of a transmission case thereby transmitting power to a final axle in the gearbox via a driven axle of the belt transmission mechanism, wherein the driven axle has an end extending into the gearbox and provided with a torque release mechanism, characterized in that the driven axle in the gearbox has an end on which is mounted a torque release mechanism for releasing the momentary increased torque and power when the terrain vehicle is thrown up and down and accelerated to increase the performance of the engine as it touches the ground.

1 Claim, 6 Drawing Sheets

STRUCTURE OF A GEARBOX FOR ALL TERRAIN VEHICLES

BACKGROUND OF THE INVENTION

1. Field of the Invention

This invention is related to the structure of a gearbox for all terrain vehicles, and in particular to one provided on the driven axle with a torque release mechanism for reducing the momentary increased loading and torque thereby preventing the chain or the driven toothed disc from being damaged.

2. Description of the Prior Art

Referring to FIGS. 1 and 2, the conventional all terrain vehicle 1 according to the present invention includes a frame 11, a steering mechanism 12, front wheel 13, a seat 14, rear wheels 15, and a power unit 2. The front portion of the frame 11 is pivotally connected with the steering mechanism 12 under which are mounted the front wheels 13. The seat 14 is arranged behind the steering mechanism 12 and on the frame 11. The power unit 2 is installed under the seat 14. As shown in FIG. 2, the power unit 2 includes an engine 21, a transmission case 22 and a gearbox 4 driven by the engine 21. The gearbox 4 has a final axle 235 which drives the rear wheel axle 24 via a chain 236. The rear wheels 15 are drivingly connected with the rear wheel axle 24.

As shown in FIG. 2, the fuel is first mixed with fresh air and then transmitted to a combustion chamber 211 of the engine 21 to generate power thereby causing a piston 212 to reciprocate and therefore rotating a crankshaft 213. Then, the crankshaft 213 will drive the transmission case 22.

The transmission case 22 includes a belt transmission 3 which includes a movable disc 31 mounted on the crankshaft 213, a driving disc 32 arranged on the crankshaft and mounted on one side of the movable disc 31, an inclined plate 33 mounted on the crankshaft 213 and arranged the other side of the movable disc 31, a plurality of rolling balls 34 fitted between the movable disc 31 and the inclined plate 33, a driven shaft 35 for power transmission, a driven disc 36 arranged on the driven shaft 35, a clutch 37 mounted on the driven shaft 35, and a belt 38. The movable disc 31 and the driving disc 32 form a driving disc 3a of a belt transmission mechanism 3. The belt 38 has an end arranged on the driving disc 3a and another end disposed on the driven disc 36. The gearbox 4 is provided with a shifting mechanism 23 having a shifting hub 232 sleeved on an axle 231. The shifting hub 232 is kept in place by two compressed springs 2311 and 2312 at two ends, so that the shift hub 232 can be moved along the axle 231. When the vehicle goes forward by shifting a fork 233 towards the forward position 2321, the shifting hub 232 will be forced to move to the right side thereby compressing the spring 2312 and therefore enabling the fork 233 to move smoothly to the forward position 2321 on the shifting hub 232. In the meantime, the fork 233 will push the slider 2341 on the main axle 234 to go smoothly into the hole 23421 of the forward gear 2342. Similarly, when the vehicle is shifted to go backward, the fork 233 will be moved to the backward position 2322 thereby forcing the shifting hub 232 to move to the left side and therefore compressing the spring 2311. As a result, the fork 233 will be smoothly moved to the backward position 2322 of the shifting hub 232. At the same time, the fork 233 will push the slider 2341 to move smoothly into the hole 23431 of the backward gear 2342 thus providing a smooth shifting operation. Hence, the forward gear 2342 will drive the main axle 234 which will in turn drive the driven gear 2351 thereby rotating the main axle 234. Thereafter, the main axle 234 will drive the gear 2351 to rotate the final axle 235 simultaneously. As a consequence, the driving gear 2352 at the outer side of the final axle 235 will drive the rear wheel 15 via a chain 236 thereby enabling the vehicle to go forward or backward.

The engine 21 utilizes the power generated from the explosion to reciprocate the piston 212 thereby rotating the crankshaft 213. The driving disc 3a of the belt transmission mechanism 3 will be rotated in unison with the crankshaft 213 thereby rotating the driven disc 36 to drive the driven shaft 35 via the clutch 37. The gear shifting mechanism 23 will drive the final axle 235 which will in turn drive a driving toothed disc 241 on the rear wheel axle 241 via the chain 236 thus turning the rear wheels 15 to cause the all terrain vehicle to travel.

In order for the terrain vehicle 1 to accelerate forward or upwards at the moment of impact as it touches ground, the accelerator must be fully pressed to further increase the performance of the output torque of the engine. Due to the gravitational force and the function of the shock absorber, the chain 236 between the sprocket 2352 and the driven disc 241 will be in a tensioned condition. Furthermore, the engine will output larger power and torque when the accelerator is pressed, the chain 236 and the driven disc 241 will be subject to a large torque thus probably pulling the chain 236 away the driven disc 241. As a consequence, the chain 236 and the driven disc 241 will even be broken or damaged thereby seriously influencing the safety of the all terrain vehicle.

Therefore, it is an object of the present invention to provide an improvement in the structure of a gearbox for all terrain vehicles which can reduce the large torque or loading generated in a transient moment so as to prevent the chain 236 and the driven disc 241 from being damaged.

SUMMARY OF THE INVENTION

This invention is related to an improvement in the structure of a gearbox for all terrain vehicles.

It is the primary object of the present invention to provide a gearbox for all terrain vehicles comprising an engine having a crankshaft which drives a belt transmission mechanism of a transmission case thereby transmitting power to a final axle in said gearbox via a driven axle of said belt transmission mechanism, wherein said driven axle has an end extending into said gearbox and provided with a torque release mechanism.

The gearbox according present invention is characterized in that the driven axle in the gearbox has an end on which is mounted a torque release mechanism for releasing the momentary increased torque and power when the terrain vehicle is thrown up and down and accelerated to increase the performance of the engine as it touches the ground, The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
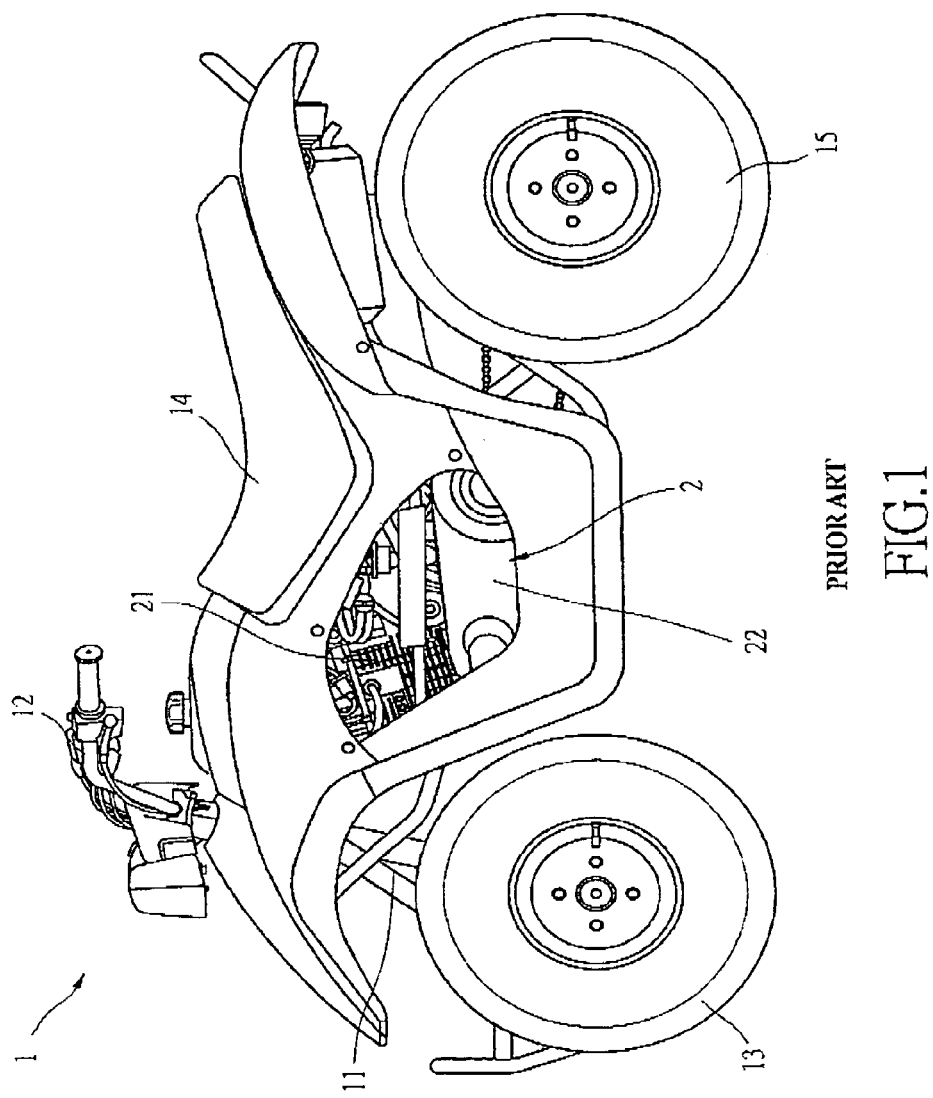
FIG. 1 is a side view of a prior art all terrain vehicle.
Figure 2:
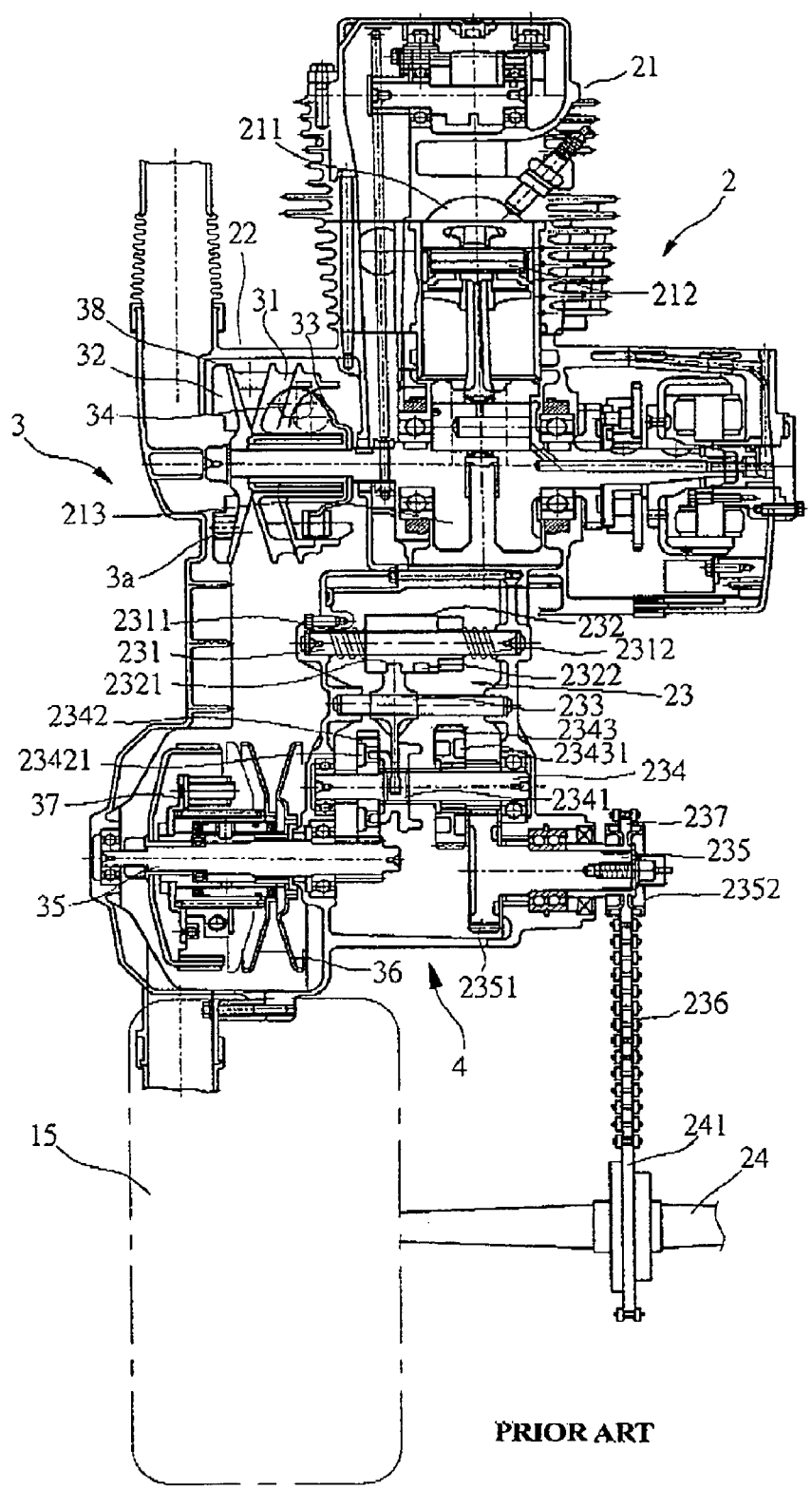
FIG. 2 is a sectional view of a prior art transmission mechanism for all terrain vehicles.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 3:
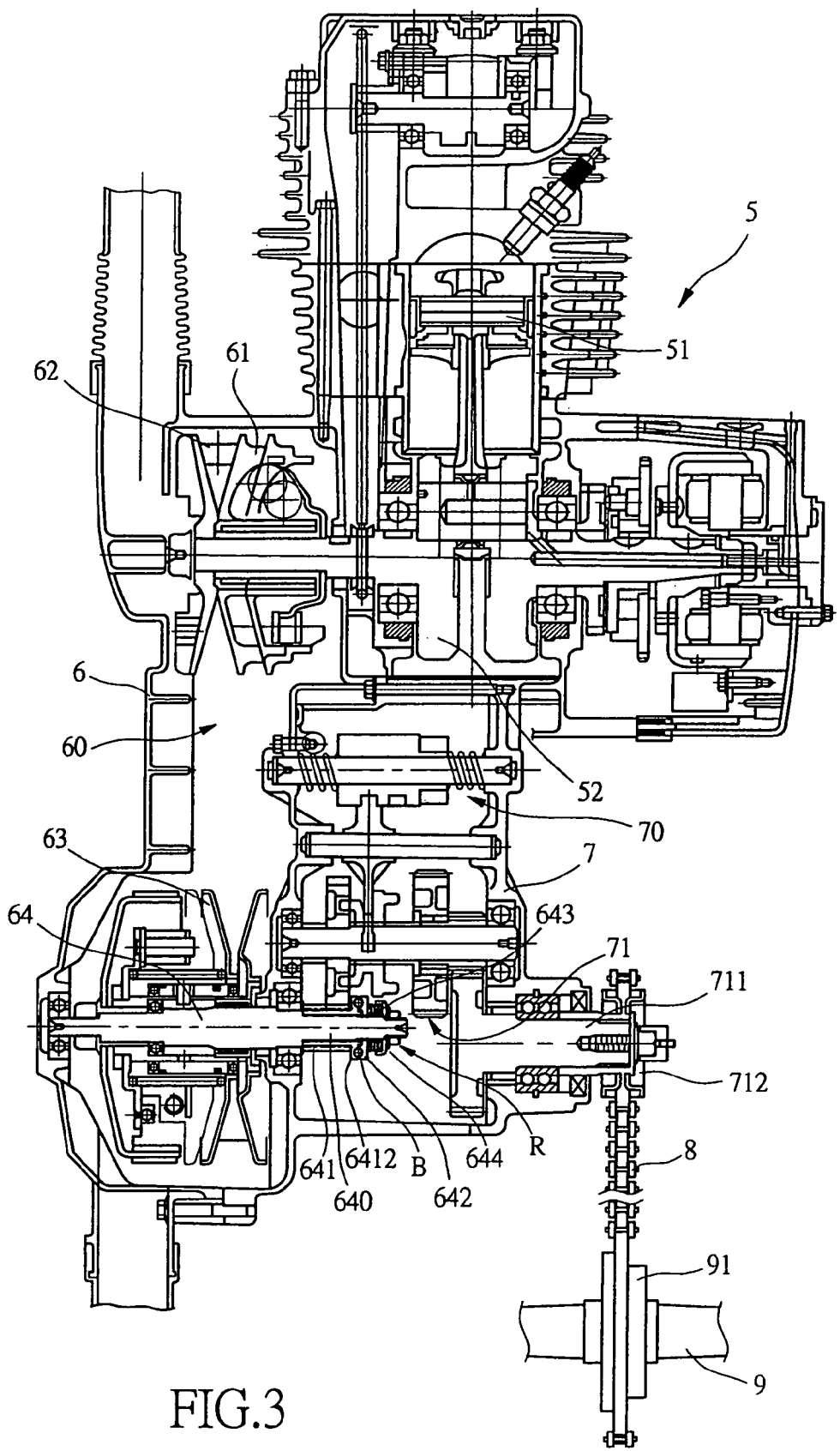
FIG. 3 is a sectional view of a transmission mechanism for all terrain vehicles according to the present invention.

With reference to FIG. 3, the all terrain vehicle according to the present invention mainly comprises an engine 5, a transmission case 6 and a gearbox 7. The transmission case 6 includes a belt transmission mechanism 60 and the gearbox 7 comprises a shifting mechanism 70 and a transmission gear train 71.

The engine 4 utilizes the power generated by explosion to push a piston 51 to reciprocate, thereby driving a crankshaft 52 to rotate. Then, the crankshaft 52 will a driving disc 61 of a belt transmission mechanism 60 in the transmission case 6. Thereafter, the driving disc 61 of the belt transmission mechanism 60 drives a driven disc 63 via a belt 62. In the meantime, the driven belt 62 will drive a driven axle 64 which will in turn drive a final axle 711 of a gear set 71 in the gearbox 7. The sprocket 712 of the final axle 711 will rotate a driven toothed disc 91 mounted on a rear wheel 9 via a chain 8.

Figure 4:
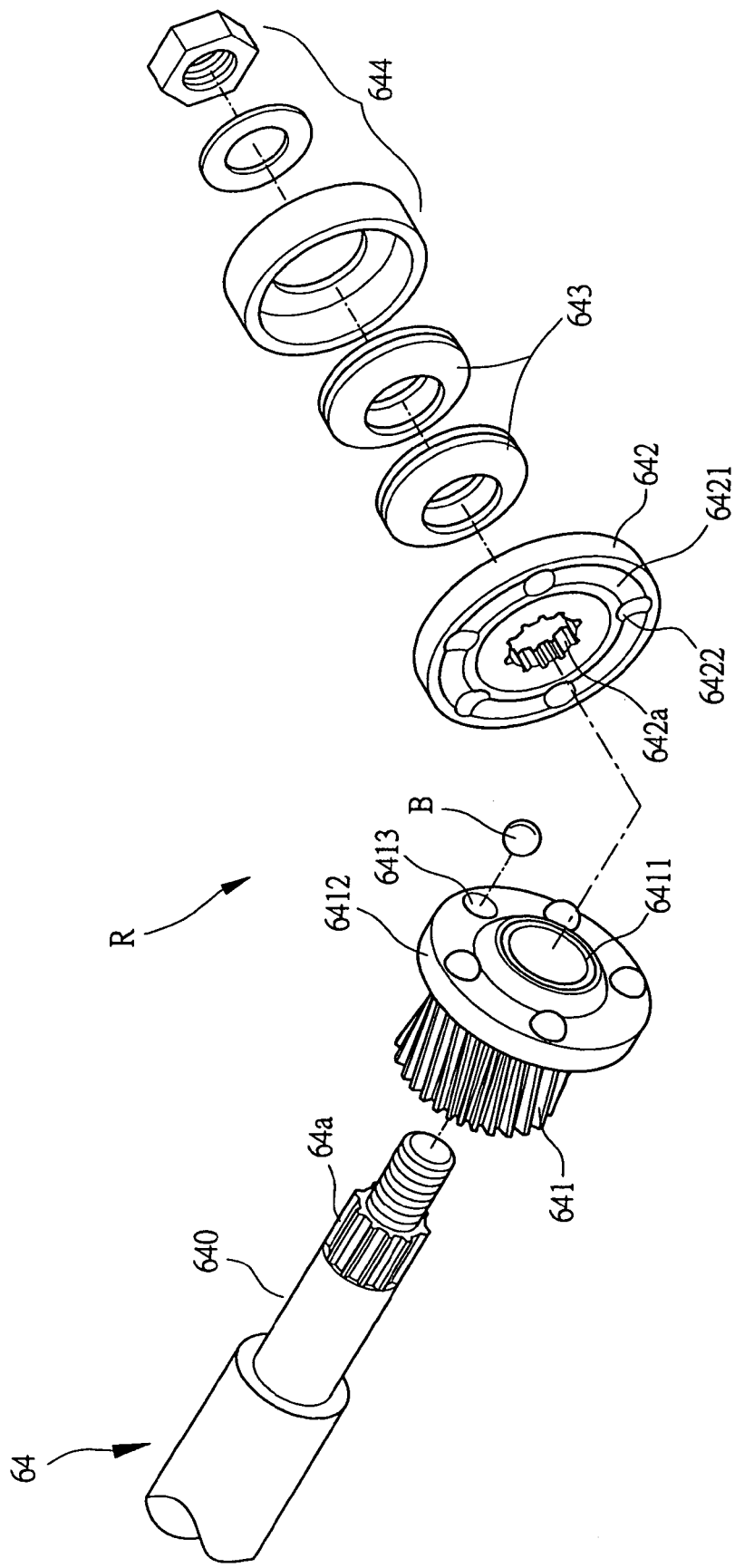
FIG. 4 is an exploded view of the torque release mechanism of the transmission mechanism according to the present invention.

Referring to FIGS. 3 and 4, the end 640 of the driven axle 64 extends into the gearbox 7 thereby driving the gear set 71 in the gearbox 7 and enabling the shifting mechanism 70 to carry out shifting operation. The present invention is characterized in the driven axle 64 which extends into the end 640 of the gearbox 7 on which are sleeved a driving gear 641, a collar 6412, a plurality of balls B, a sliding disc 642 and a resilient member 643 thereby constituting a torque release mechanism R which is locked in position by a locking member 644.

The driving gear 641 is mounted on a sleeve 6411 which is freely mounted on an end 640 of the axle 64, so that the driving gear 641 can be freely rotated on the end 640 thus preventing wearing of the driving gear 641. The sleeve 6411 has a flange 6412 formed with a plurality of recesses 6413. The sliding disc 642 has a circular groove 6421 formed with a plurality of recesses 6422 which are aligned with the recesses 6413 of the sleeve 6411, so that the balls B can be fitted therebetween. The sliding disc 642 has a spline 642a at the center which is configured to receive the splined end 64a of the axle 64 thereby enabling the driven axle 64 to rotate the sliding disc 642. The resilient members 643 are limited by the locking members 644 and disposed between the sliding disc 642 and the locking members 644. The resilient member 643 is a spring disc in this preferred embodiment and can be replaced by any other suitable resilient members.

When the all terrain vehicle is traveling, the power generated by the engine 51 will be transmitted by the driven axle 64 of the belt transmission mechanism 60 in the transmission case 6 to the sliding disc 642 on the end 640 of the driven axle 64. Then, the sliding disc 642 will drive the driving gear 641 will drive the gear set 71 of the gearbox 7. Thereafter, the sprocket 712 on the final axle 711 of the gear set 71 will drive the rear wheel axle 9 via a chain 8 thereby rotating the rear wheel and therefore enabling the vehicle to travel.

Figure 5:
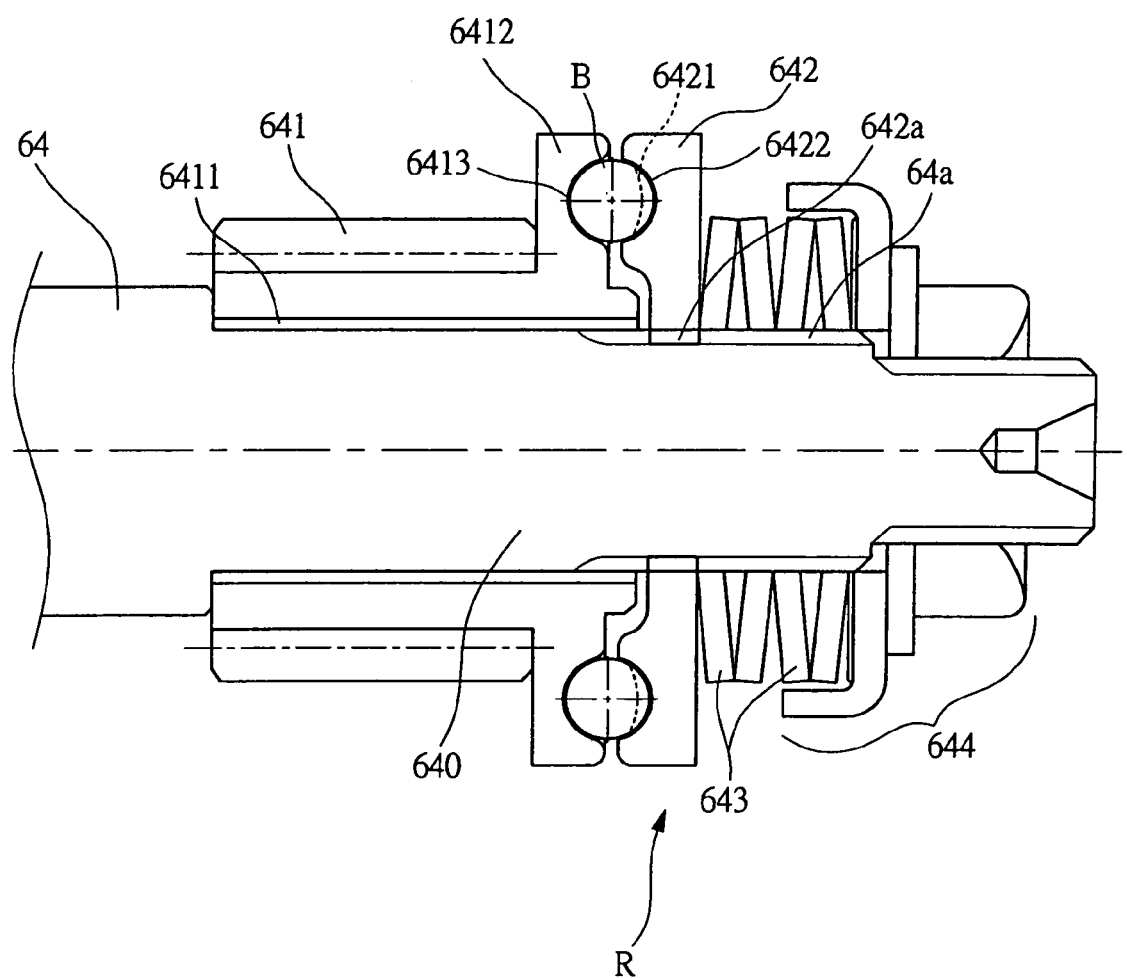
FIGS. 5 and 6 illustrate the working principle of the torque release mechanism according to the present invention.

As shown in FIGS. 3, 4 and 5, the power generated by the engine 5 drives the driven axle 64 via the belt transmission mechanism 60 of the transmission case 6. By means of the teeth 64a formed at the end 640 of the driven axle 64, the sliding disc 642 will be driven. Meanwhile, the sliding disc 642 is pushed by the resilient member 643 so that the sliding disc 642 can drive the flange 6412 and the driving gear 641 via the balls B. Thereafter, the sprocket 712 on the final axle 711 of the gear set 71 will drive the driven toothed disc 91 via the chain 8 thereby rotating the rear wheel (not shown) and therefore causing the vehicle to travel.

Figure 6:
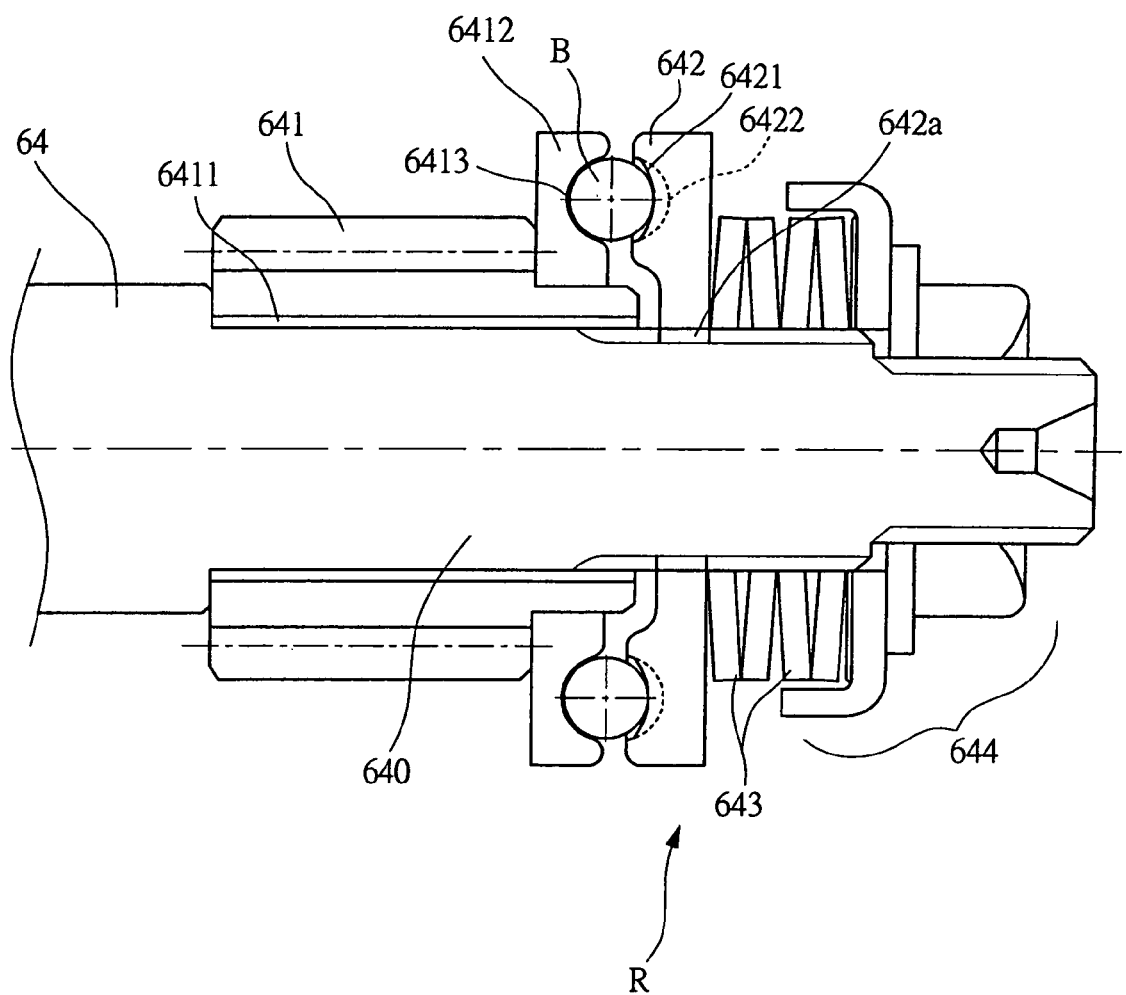

Referring to FIGS. 3 and 6, when the all terrain vehicle is thrown up and down on the ground, the chain 8 is stretched by the driven toothed disc 91. Then, when the all terrain vehicle is accelerated, the engine 5 will generate larger power and torque through the belt transmission mechanism 60 of the transmission case 6 to the driven axle 64. The power and torque increased at this moment will cause the balls B to slide out of the space between the recesses 6422 of the sliding disc 642 and the recesses 6413 of the flange 6412 into the circular groove 6421 of the sliding disc 642. When the balls B slide into the circular groove 6421, the sliding disc 642 will slide towards the resilient member 643 thereby compressing the resilient member 643 having an end pressed against the locking member 644. Hence, the space produced by the compression of the resilient member 643 will enable the balls B to push the sliding disc 642 to the space. When the balls B slides into the circular groove 6421 of the sliding disc 642, the power transmitted to the driven axle 64 from the belt transmission mechanism 60 cannot be transmitted from the sliding disc 642 to the flange 6412 and the driving gear 641 thus making it unable to rotate the driving gear 641. Due to the sliding of the sliding disc 642, the driving gear 641 on the end 640 of the driven axle 64 will no longer transmit the power and torque generated at the moment when the all terrain vehicle is accelerated to the chain 8 and the driven toothed disc 91 via the final axle 711 of the gear set 71 in the gearbox 7 thereby preventing the chain 8 and the driven toothed disc 91 from being damaged.

When the power and torque generated at the moment when the vehicle is accelerated is reduced to a predetermined value, the resilient member 643 will push the sliding disc 642 back to its original position. In the meantime, the ball B in the annular groove 6421 will be forced back into the recesses 6422 thereby causing the driven axle 64 to drive the sliding disc 642 and enabling the sliding disc 642 to drive the flange 6412 and the driving gear 641 via the balls B and therefore causing the all terrain vehicle to travel.

In conclusion, the gearbox according present invention is characterized in that the driven axle 64 in the gearbox 7 has an end 640 on which is mounted a torque release mechanism R for releasing the momentary increased torque and power when the terrain vehicle is thrown up and down and accelerated to increase the performance of the engine as it touches the ground, It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A gearbox for all terrain vehicles comprising an engine having a crankshaft which drives a belt transmission mechanism of a transmission case thereby transmitting power to a final axle in said gearbox via a driven axle of said belt transmission mechanism, wherein said driven axle has an end extending into said gearbox and provided with a torque release mechanism, said torque release mechanism comprises a driving gear, a flange, a plurality of balls, a sliding disc and a resilient member on said end of said driven axle, said flange has a plurality of recesses, said sliding disc is formed with a circular groove facing said driving gear, said circular groove has a plurality of recesses aligned with said recesses of said flange thereby enabling said balls to be received therebetween, said resilient member has an end abutting against a locking member and arranged between said sliding disc and said locking member, said driving gear is freely rotatably mounted on said end of said driven axle, said sliding disc has teeth engageable with teeth of said end of said driven axle, and said driving gear is fixedly mounted on said flange.

\* \* \* \* \*